US011168768B1

(12) United States Patent
Israr et al.

(10) Patent No.: US 11,168,768 B1
(45) Date of Patent: Nov. 9, 2021

(54) COLLABORATIVE SHEAR DISPLAY

(71) Applicant: Facebook Technologies, LLC, Menlo Park, CA (US)

(72) Inventors: Ali Israr, Bothell, WA (US); Priyanshu Agarwal, Sunnyvale, CA (US); Pratheev Sabaratnam Sreetharam, Cambridge, MA (US)

(73) Assignee: Facebook Technologies, LLC, Menlo Park, CA (US)

( * ) Notice: Subject to any disclaimer, the term of this patent is extended or adjusted under 35 U.S.C. 154(b) by 397 days.

(21) Appl. No.: 16/296,182

(22) Filed: Mar. 7, 2019

Related U.S. Application Data

(60) Provisional application No. 62/801,599, filed on Feb. 5, 2019.

(51) Int. Cl.
*F16H 25/20* (2006.01)
*G06F 3/01* (2006.01)
*F16H 25/24* (2006.01)

(52) U.S. Cl.
CPC .......... *F16H 25/20* (2013.01); *G06F 3/016* (2013.01); *F16H 2025/204* (2013.01); *F16H 2025/2445* (2013.01); *G06F 3/012* (2013.01)

(58) Field of Classification Search
CPC .......... F16H 25/20; F16H 2025/204; F16H 2025/2445; G06F 3/012; G06F 3/016
USPC ............... 74/89.2, 89.23, 89.32, 89.33
See application file for complete search history.

(56) References Cited

U.S. PATENT DOCUMENTS

| | | | | |
|---|---|---|---|---|
| 5,140,863 A | * | 8/1992 | Niino | B23Q 1/36 74/89.36 |
| 7,350,432 B2 | * | 4/2008 | Somschor | F16H 61/32 74/335 |
| 10,753,442 B2 | * | 8/2020 | Chou | F16H 25/20 |
| 2013/0319146 A1 | * | 12/2013 | Lee | F16H 25/20 74/89.23 |

OTHER PUBLICATIONS

Chinello et al., "Design and Evaluation of a Wearable Skin Stretch Device for Haptic Guidance", IEEE Robotics and Automation Letters, IEEE 2018, vol. 3, No. 1, 8 pages.
Gupta et al., SqueezeBlock: Using Virtual Springs in Mobile Devices for Eyes-Free Interaction, Proceedings of the 23nd annual ACM symposium on user interface software and technology, Oct. 3-6, 2010, 4 pages.

(Continued)

*Primary Examiner* — Randell J Krug
(74) *Attorney, Agent, or Firm* — FisherBroyles, LLP

(57) ABSTRACT

A haptic device includes a network of motorized shear actuators. The shear actuators each include a drive mechanism and a lead screw having a threaded outer surface rotatably coupled to the drive mechanism and extending along a primary axis. A carriage is movably coupled to the lead screw by a nut having a threaded inner surface and is disposed within a chassis. One or more flexure springs are attached to the chassis and are configured to exert a reactive force to resist a force applied to the carriage in a direction orthogonal to or substantially orthogonal to the primary axis. The flexure springs may cooperate with a stop mechanism to improve the mechanical robustness of the shear actuators under applied loads.

11 Claims, 15 Drawing Sheets

(56) References Cited

OTHER PUBLICATIONS

Choi et al., "Grabity: A Wearable Haptic Interface for Simulating Weight and Grasping in Virtual Reality", Proceedings of the 30th Annual ACM Symposium on User Interface Software and Technology, Oct. 22-25, 2017, 12 pages.

Bark et al., "A Wearable Skin Stretch Device for Haptic Feedback", Third Joint EuroHaptics conference and Symposium on Haptic Interfaces for Virtual Environment and Teleoperator Systems, Mar. 18-20, 2009, pp. 464-469.

Girard et al., "HapTip: Displaying Haptic Shear Forces at the Fingertips for Multi-Finger Interaction in Virtual Environments", Frontiers in ICT, vol. 3, No. 6, Apr. 2016, pp. 1-15.

Schorr et al., "Fingertip Tactile Devices for Virtual Object Manipulation and Exploration", Proceedings of the 2017 CHI Conference on Human Factors in Computing Systems, May 6-11, 2017, pp. 3115-3119.

Tsagarakis et al., "Slip Aestheasis: A Portable 2D Slip/Skin Stretch Display for the Fingertip", Proceedings of the First Join Eurohaptics Conference and Symposium on Haptic Interfaces for Virtual Environment and Teleoperator Systems, Mar. 2005, 6 pages.

Webster III et al., "A Novel Two-Dimensional Tactile Slip Display: Design, Kinematics and Perceptual Experiments", ACM Transactions on Applied Perception (TAP), vol. 2, No. 2, Apr. 2005, pp. 150-165.

Slocum, Alexander, "Topic 6: Power Transmission Elements II", Fundamentals of Design, 2008, 62 pages.

Purves et al., "Mechanoreceptors Specialized to Receive Tactile Information", Neuroscience—NCBI Bookshelf, URL: https://www.ncbi.nlm.nih.gov/books/NBK10895/, 2001, 2 pages.

Nakazawa et al., "Characteristics of human fingertips in the shearing direction", Biological cybernetics, vol. 82, Apr. 2000, pp. 207-214.

Pezent et al., "Tasbi: Multisensory Squeeze and Vibrotactile Wrist Haptics for Augmented and Virtual Reality", Proceedings of the IEEE WHC 2019, 2019, 6 pages.

\* cited by examiner

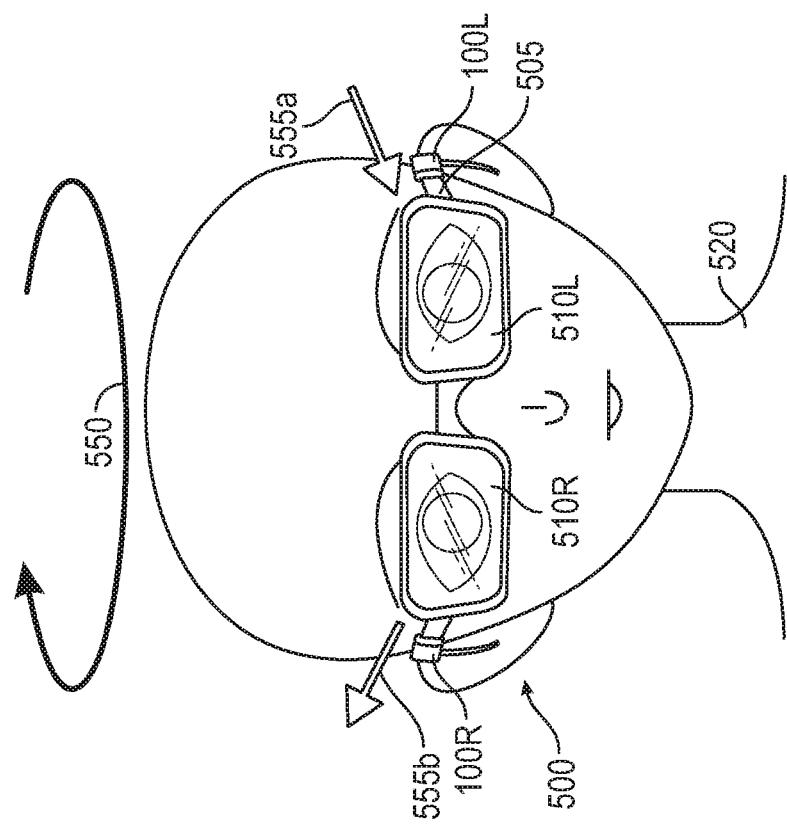
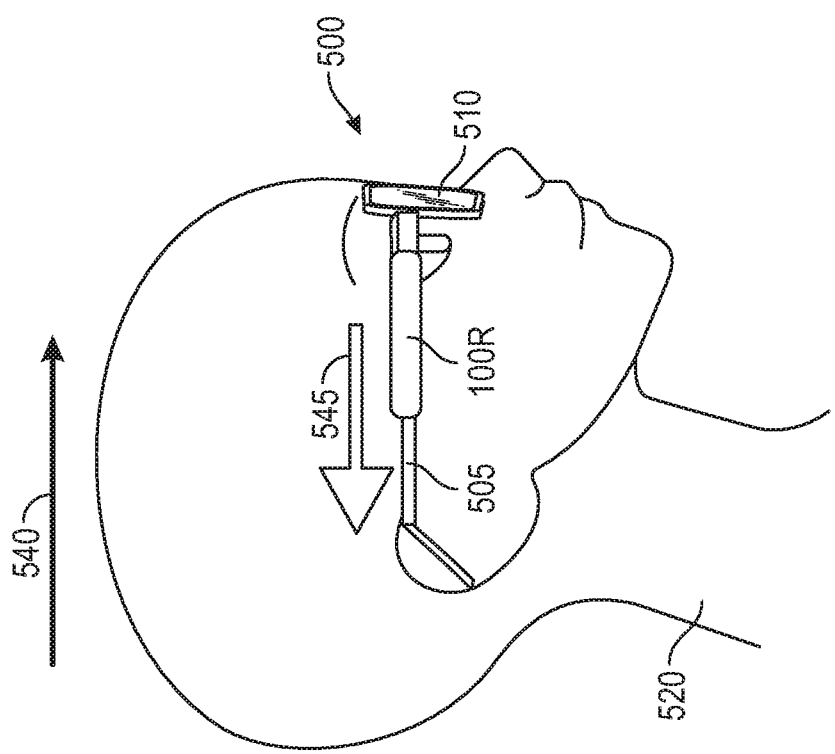
FIG. 6
FIG. 5

COLLABORATIVE SHEAR DISPLAY

CROSS-REFERENCE TO RELATED APPLICATION

This application claims the benefit of priority under 35 U.S.C. § 119(e) of U.S. Provisional Application No. 62/801,599, filed Feb. 5, 2019, the contents of which are incorporated herein by reference in their entirety.

BACKGROUND

Virtual reality (VR) and augmented reality (AR) systems and devices may enable users to experience events, such as interactions with people in a computer-generated simulation of a three-dimensional world or viewing data superimposed on a real-world view. Moreover, VR/AR systems may also be used for purposes other than recreation. For example, governments may use VR/AR systems for military training, doctors may use such systems to simulate surgery, and engineers may use such systems as design visualization aids.

In augmented reality systems, for instance, computer graphics can be merged with actual imagery in real time for display to a user. Furthermore, the scope of augmented reality has expanded recently to include non-visual augmentation, such as haptic feedback. In this vein, various systems have been proposed for integrating haptic information into VR/AR, but such systems are typically complicated or limited to simple vibrational interaction with the user. Notwithstanding recent developments, it would be advantageous to provide variable VR/AR systems that provide, for example, interactive haptic stimulation in a wearable form factor.

SUMMARY

As will be described in greater detail below, the instant disclosure relates generally to haptic feedback devices, and more specifically to haptic devices that include a plurality of shear actuators. Example devices include hand-held devices and wearable devices, such as head-mounted displays.

In accordance with various embodiments, a shear actuator may include a drive mechanism, a lead screw having a threaded outer surface rotatably coupled to the drive mechanism and extending along a primary axis, and a carriage disposed within a chassis, where the carriage may be movably coupled to the lead screw by a nut having a threaded inner surface. The lead screw mechanism may provide a simple and reliable construction with relatively few components that may be incorporated into a variety of form factors.

In the various embodiments, the carriage may be configured to bilaterally translate along the primary axis and may include a radially-extending output flange. A contact element for contacting the skin of a user may be attached to the output flange.

The inner surface of the nut may be threaded over the outer surface of the lead screw, where a bottom surface of the nut is configured to contact an upper surface of the chassis in response to a normal force exerted on the output flange. In some embodiments, a bottom surface of the nut may be slideably engaged with a bearing disposed over an upper surface of the chassis and, in response to a normal force exerted on the output flange, a bottom surface of the nut may be configured to contact an upper surface of the chassis, which can arrest further lateral deflection of the carriage caused by the normal force.

In some embodiments, translation of the carriage may be monitored and/or controlled using a sensing element that may be mounted to the chassis proximate to the carriage. A device, such as a head-mounted display or a hand-held device, may include, according to certain embodiments, independently-controlled primary and secondary shear actuators. Primary and secondary shear actuators may be activated synchronously or asynchronously.

A flexure spring may be attached to the chassis, such that the flexure spring can exert a reactive force to resist a force applied to the carriage in a direction orthogonal to or substantially orthogonal to the primary axis.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a schematic diagram illustrating the sensation of forward motion created by the incorporation of shear actuators into a head-mounted display frame according to certain embodiments.

FIG. 6 is a schematic diagram illustrating the sensation of rotational motion created by the incorporation of shear actuators into a head-mounted display according to certain embodiments.

Figure 1:
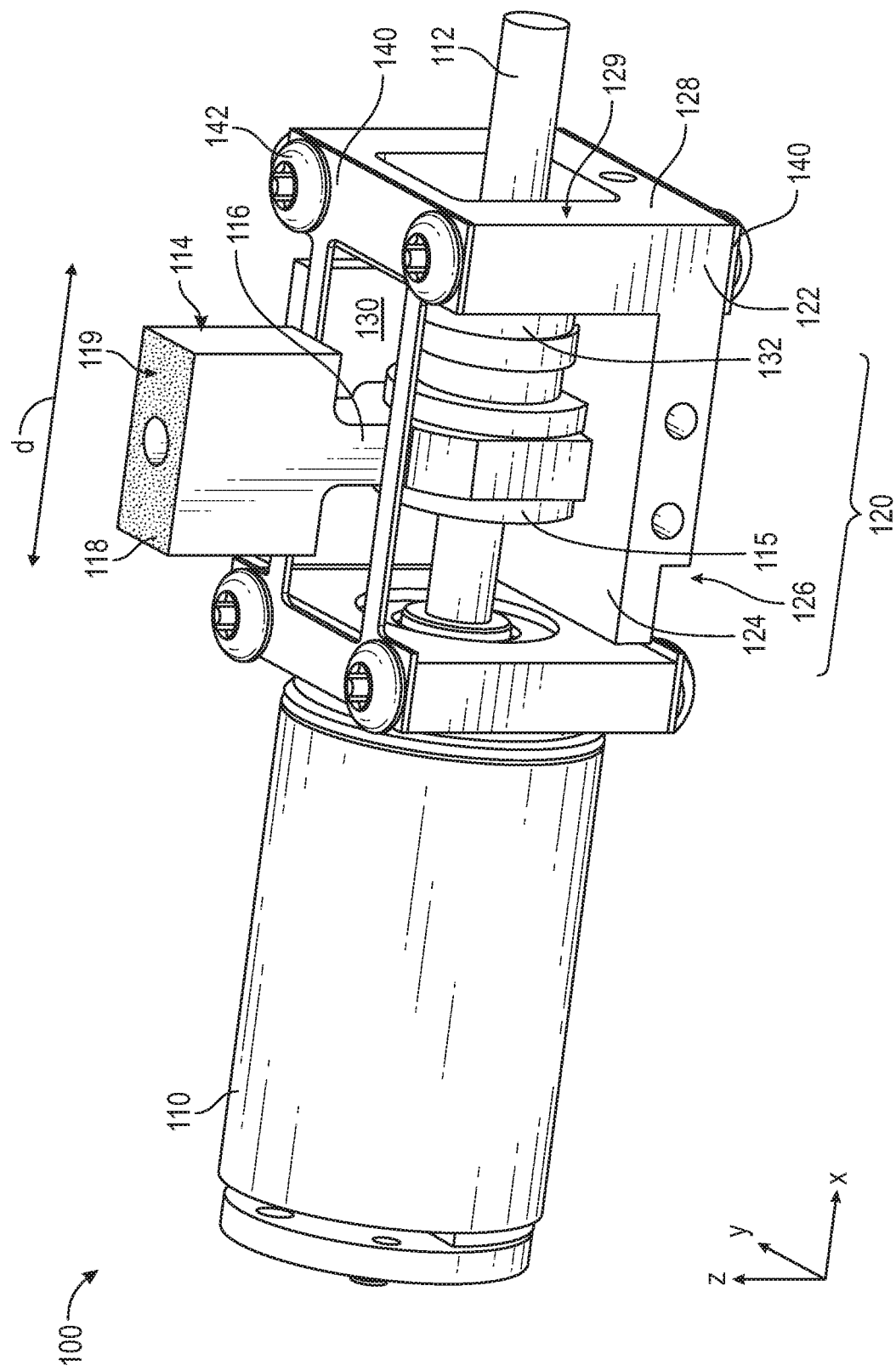
FIG. 1 is a perspective view of an example shear actuator according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is directed generally to haptic devices and more specifically to haptic devices that include a plurality of shear actuators configured to cooperatively provoke a sensory response (e.g., the illusion of motion) in a user.

As will be appreciated, the implementation of plural shear actuators may address a number of challenges associated with the design and construction of haptic shear displays, including the realization of a compact and lightweight form factor operable at desired speeds and bandwidths.

According to some embodiments, multiple shear actuators may be incorporated into a variety of different platforms, including handheld devices and head-mounted displays as well as other wearable form factors such as gloves, wristbands, vests, shoes, or belts. Such multiple shear actuators may be configured to stimulate the surface of the skin of a user. According to some embodiments, an example haptic device may include multiple shear actuators that may be controlled independently.

Plural shear actuators may be configured to cooperatively engage with a user to provide a variety of haptic effects, including vibration, stretch, and shear. In some embodiments, these haptic effects may be integrated to create a desired sensory response, such as the sensation of movement or interaction with a real or virtual object. Two or more shear actuators fitted to a head-mounted display, for example, may exert a simultaneous rearward force that may create for the user an illusion of forward motion.

As described in further detail herein, a shear actuator may include a motor and a carriage movably coupled to the motor. The carriage, which may be disposed within a stationary chassis, may include a contact element for physically interacting with the skin of a user. The contact element, which may include a tactile contact surface, may be configured to translate or oscillate and thereby create a lateral deflection or shear of the user's skin during operation of the shear actuator.

In some embodiments, the shear actuators may further include an onboard sensor, such as a Hall Effect sensor, that is adapted to sense and monitor the location and thus the extent and rate of displacement of the carriage relative to the chassis. The sensor may monitor the location of the carriage in real-time and may, in certain embodiments, be used to control the actuator in a closed-loop configuration.

According to some embodiments, the incorporation of flexure springs and/or a mechanical stop into the actuator design may be used to enhance the mechanical robustness of the actuator during use. That is, in addition to being configured to exert a shear force on a user, the shear actuators may also be configured to resist excessive forces exerted by the user or the user's environment, such as a gripping force in the example of a hand-held device. In this regard, according to some embodiments, the chassis may include one or more flexure springs configured to resist a non-shear (i.e., normal) force.

A "normal" force, such as a gripping force, may be exerted on the actuator, i.e., on the carriage, in a direction orthogonal to, or substantially orthogonal to, a translation direction of the carriage. That is, a normal force may be exerted in a direction orthogonal to, or substantially orthogonal to, the primary axis of a lead screw, i.e., the x-axis. As used herein, a "substantially orthogonal" or "substantially normal" force may be applied to a surface within ±10° of a surface normal.

In addition to, or in lieu of, one or more flexure springs, the shear actuator may include a mechanical stop that may arrest undesired deflection of the carriage, such as during application of a normal load. According to some embodiments, preventing unintended or excessive displacement of the carriage can decrease the likelihood of damage to the shear actuator, including the motor, in the event that an excessive normal force is applied.

Further to the foregoing, the following will provide, with reference to FIGS. 1-14 a detailed description of methods, systems, and apparatuses for forming and implementing haptic devices that include a network of shear actuators. The discussion associated with FIGS. 1-3 includes a description of the components and operation of example shear actuators. The discussion associated with FIGS. 4A-4C includes a description of example contact elements having various contact surfaces. The discussion associated with FIGS. 5 and 6 relates to an example head-mounted display having shear actuators incorporated into the support or frame thereof. The discussion associated with FIGS. 7 and 8 relates to the incorporation of shear actuators into a hand-held device. The discussion associated with FIGS. 9-11 relates to exemplary AR and VR device architectures that may include multiple shear actuators. The discussion associated with FIGS. 12-14 relates to exemplary haptic systems that may include one or more shear actuators.

Referring to FIG. 1, shown is a perspective view of an example shear actuator according to some embodiments. Shear actuator 100 includes a drive mechanism 110, such as a motor, and a chassis 120 having a frame 122 disposed adjacent to the drive mechanism 110. According to some embodiments, the drive mechanism 110 may include any suitable motor, including a stepper motor, piezoelectric motor, or a brushed or brushless DC motor having a rotatable output shaft. The stationary chassis 120 includes a frame 122 that may be formed from a non-compliant material, such as a hardened plastic. Example plastic materials include thermoset or thermoplastic materials. In some embodiments, the frame 122 may include a metal, e.g., aluminum. Frame 122 may be formed by molding, casting, or machining, for example.

The shear actuator 100 may, in various embodiments, be configured for use in a wearable device (not shown) and may thus have a wearable form factor. For instance, an example drive mechanism 110 may have a diameter of approximately 12 mm or less, e.g., 8, 10, or 12 mm, including ranges between any of the foregoing values, and a length of approximately 30 mm or less, e.g., 20, 25, or 30 mm, including ranges between any of the foregoing values. Example shear actuators 100 may weigh less than 10 grams, e.g., less than 5 grams.

The shear actuator 100 may include a lead screw 112 rotatably coupled to the drive mechanism 110 and a carriage 114 engaged with the lead screw 112. In some embodiments, the carriage 114 is configured to move within the chassis 120. As will be appreciated, drive mechanism 100 may rotate the lead screw 112 in clockwise and counterclockwise directions about the x-axis.

In some embodiments, the lead screw 112 may have a threaded outer surface. A nut 115 having an internally threaded surface may be threaded over the lead screw 112. In certain embodiments, the nut 115 is constrained from rotating with the lead screw 112, such that rotation of the lead screw 112 causes the nut 115 to translate along a length of the lead screw 112. The carriage 114 may be affixed to the nut 115 such that translation of the nut 115 relative to the lead screw 112 drives the carriage 114 in a linear direction.

In the illustrated embodiment, an output flange 116 extends radially from the carriage 114 such that during operation of the drive mechanism 110, rotation of the lead screw 112 may cause a lateral displacement of the carriage 114 and hence a net displacement (d) of the output flange 116 with respect to the chassis 120, i.e., along an axis (x). In certain embodiments, referring to FIG. 2, the drive mechanism 110 may be used to drive the chassis back and forth via a plate bearing 124, which is slideably disposed over a lower portion of the frame 122.

In some embodiments, the carriage 114 may be capable of a net displacement (d) of up to approximately 10 mm, e.g., a net displacement of up to approximately 0.5, 1, 2, 5, or 10 mm, including ranges between any of the foregoing values, and render approximately 2 Newtons or more of lateral force. The net displacement may be achieved at a drive rate of up to approximately 100 mm/sec, e.g., a drive rate of approximately 0.5, 1, 2, 5, 10, 20, 50 or 100 mm/sec, including ranges between any of the foregoing values. In various embodiments, during use, drive mechanism 110 may drive the carriage 114 in a single stroke (i.e., forward or backward) or in a bilateral, oscillatory manner with an oscillation frequency that may range from approximately 0.1 Hz to approximately 60 Hz, e.g., 0.1, 0.2, 0.5, 1, 2, 5, 10, 20, 30, 40, 50, or 60 Hz, including ranges between any of the foregoing values. These and other operational parameters can be used to generate a wide range of shear effects to simulate a variety of forces, such as directional push-pull, vibration, and dynamic mass movement via direct contact with the user's skin.

In various embodiments, a contact element 118 may be affixed to the output flange 116 for contacting the skin of a user. The contact element 118 and/or the contact surface 119 of the contact element 118, may include one or more suitable materials effective to support and transmit force feedback. Example materials may be compliant such as elastomeric materials, and may additionally include textiles, foams, or rubbers, which may be adapted to exert a shear stress when displaced while contacting the skin of a user. The contact surface 119 may be padded or textured, for example. Example contact surfaces may be plain or finished, such as having a line grating or a dot grating. In some embodiments, the contact element 118 may exert a force having a magnitude in excess of approximately 2 Newtons. In some embodiments, the contact element 118 may be removable, i.e., replaceable.

Figure 2:
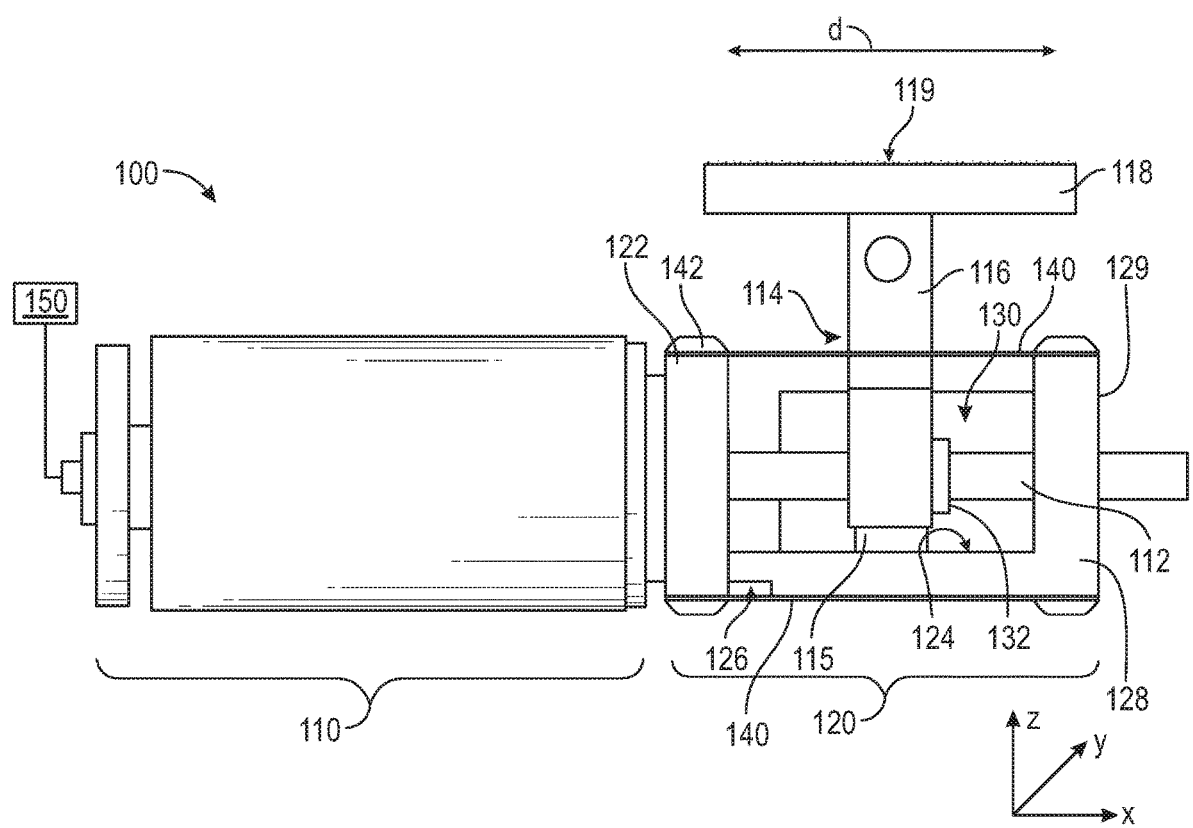
FIG. 2 is a cross-sectional view of the shear actuator of FIG. 1 according to some embodiments.

The contact element 118 and the corresponding contact surface 119 may be shaped in any geometry suitable for a given device and/or application. By way of example, contact element 118 in FIG. 1 and FIG. 2 is shown to have a contact surface 119 that is substantially planar. Such a planar configuration is not limiting, however, as the contact surface 119 may alternatively present a non-planar (e.g., ergonomic) topology that may be configured to engage a particular part of a user's body, such as a finger, hand, or the head.

In examples where the contact surface 119 is moved over a surface of the user's skin, the perpendicular force between the contact surface 119 and the skin may be referred to as the normal force (n) while the force that opposes relative (shear) movement may be referred to as the friction force (f). Without wishing to be bound by theory, the coefficient of friction OA may be related to the ratio of the friction force to the normal force, $\mu=f/n$. As will be appreciated by those skilled in the art, higher coefficients of friction cause higher shear forces at the skin surface. In accordance with certain embodiments, the contact surface 119 may be selected such that the coefficient of friction between the contact surface 119 and the user's skin is at least approximately 0.25, e.g., 0.25, 0.5, 0.75, 1, 1.25, 1.5 or 1.75, including ranges between any of the foregoing values, although lesser and greater coefficients of friction are contemplated. Different contact surfaces 119 may have, e.g., the same or different coefficients of friction, thermal conductivity, smoothness/roughness, etc.

According to some embodiments, the net displacement (d) of the carriage 114 (and thus the net displacement of the output flange 116) may be monitored by a sensor system. Sensor system 130 may be configured to measure the linear displacement of the carriage 114 relative to the chassis 120, and may include an analog Hall Effect sensor, for example.

As will be appreciated by those skilled in the art, a Hall Effect sensor immersed in a magnetic field produces an output voltage related to the component of the flux density of the magnetic field that is perpendicular to its sensing surface. Thus, the relative proximity of the carriage 114 to a sensing element 132 (e.g., a permanent magnet) mounted to or disposed over the lead screw 112 can induce an output voltage that may vary in a substantially linear manner along the displacement path of the carriage 114. Such output voltage may be used to determine and control the location of the output flange 116, i.e., in a closed-loop configuration.

Referring still to FIG. 1, and as can be seen also with reference to the corresponding cross-sectional view of FIG. 2, flexure springs 140 may be affixed to the frame 122 using screws 142 to span a gap between elements of the frame 122. In the illustrated embodiment, a pair of flexure springs are oriented substantially parallel to the lead screw 112, i.e., substantially parallel to the translation direction of the carriage 114. In further embodiments, one or more flexure springs 140 may span a gap between or otherwise connect elements of the frame 122 along other dimensions. Flexure springs 140 may directly contact portions of frame 122. In some embodiments, frame 122 may include a recessed region 126 such that a least a portion of the flexure springs 140 may be spaced away from frame 122, which allows bilateral deformation of the flexure springs 140, i.e., in +z as well as −z directions.

The flexure springs 140 may be configured to resist or inhibit deformation of the frame 122, e.g., under the influence of an externally-applied load. In some embodiments, the flexure springs may exert a reactive force to resist a normal force of up to approximately 10 Newtons, e.g., 2, 4, 6, 8 or 10 Newtons, including ranges between any of the foregoing values.

Furthermore, flexure springs 140 may facilitate the manufacture and assembly of shear actuator 100. That is, the flexure springs 140 may introduce a finite compliance to an otherwise rigid structure. During assembly, for example, minor alignment errors, e.g., between components, may be tolerated as different degrees of flexure spring pre-loading.

In addition to flexure springs 140, the shear actuator 100 may include a mechanical stop configured to arrest undesired deflection of the carriage 114, such as during application of a normal force. For example, in the event that a normal force is exerted on the output flange 116, an allowable amount of deflection of the output flange 116 may cause a mechanical stop, such as nut 115, to contact a lower portion of the frame 122, which may prevent further deflection. In some embodiments, by arresting a transverse deflection of the carriage 114 and the output flange 116, damage to the shear actuator 100, including drive mechanism 110, may be avoided.

In some embodiments, the chassis 120 may include a ground plate 128 configured to insulate and prevent contamination of rendered forces by reactive forces that may arise from other parts of the user's body. In some embodiments, the ground plate 128 may constitute a portion of the frame 122. In some embodiments, the ground plate 128 may include a non-compliant material and may have a mounting surface 129 for affixing the shear actuator 100 to a device (not shown).

In some embodiments, a controller 150 may be used to send and receive information to and from the drive mechanism 110 and/or the sensor system 130 of each shear actuator 100. In some embodiments, controller 150 may include a microcontroller or a computer system. The controller 150 may be coupled to the chassis 120 through a mechanical link and/or electrical wiring, for example, to facilitate communication of information between the controller 150, the drive mechanism 110 and the sensor system 130. The information may be an electronic control signal that controls the shear actuator 100 and the rotation of lead screw 112. Furthermore, the controller 150 may be configured to monitor translation of the output flange 116 and record displacement and skin shear information, for example.

Figure 3:
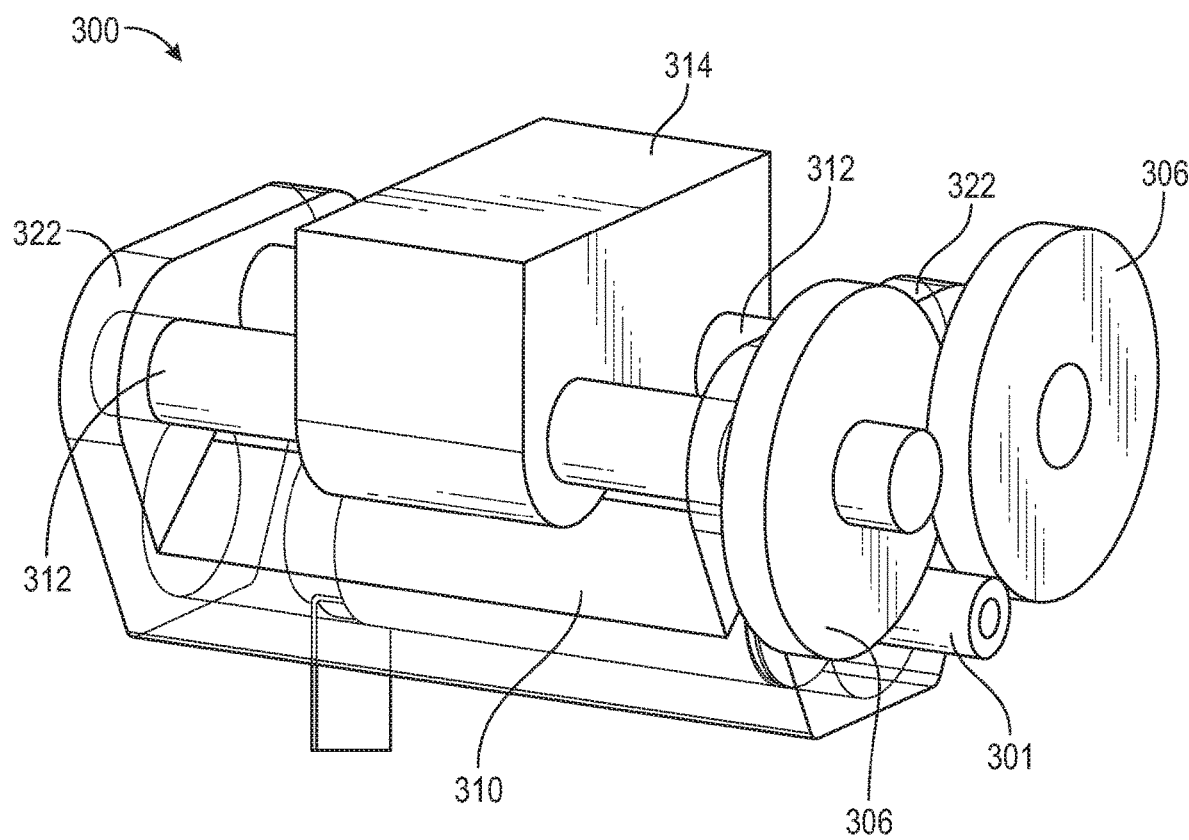
FIG. 3 is a perspective view of an example shear actuator according to certain embodiments.

Referring to FIG. 3, a shear actuator may exhibit a "folded" configuration. In shear actuator 300, which is an example of a folded dual lead screw design, a pair of lead screws 312 may be positioned adjacent to drive mechanism 310 and each rotatably connected to drive shaft 301 via a pair of spur gears 306. Drive mechanism 310 and lead screws 312 may be disposed within a frame 322, and a carriage 314 may be movably coupled to the lead screws 312. Compared with the shear actuator of FIGS. 1 and 2, the folded configuration of FIG. 3 may provide a more compact system than directly driving a lead screw.

In certain embodiments, gear pair 306 may provide a stepdown of the drive mechanism speed, which may allow the selection of more efficient lead screws with a higher lead angle. Furthermore, in some embodiments, the spur gears 306 may simultaneously actuate lead screws 312 with identical gear ratios, thereby providing an anti-rotation functionality, which may obviate the need for a linear bearing, while reducing frictional losses and the potential for jamming.

Figure 4A:
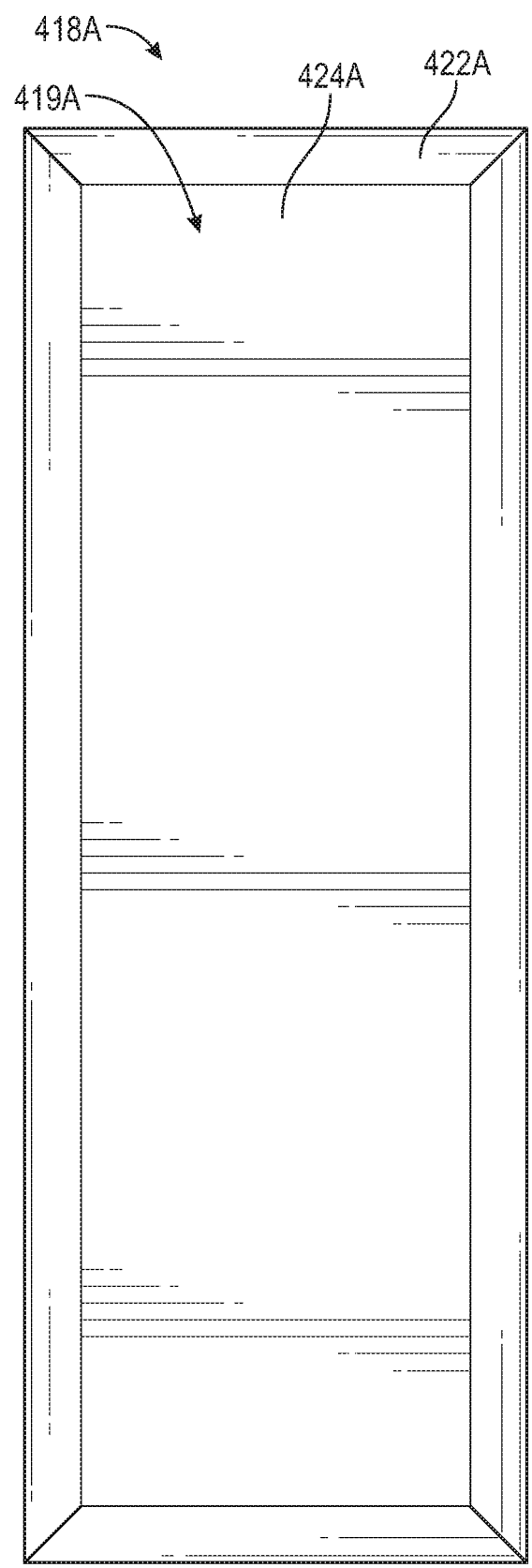
FIGS. 4A-4C illustrate various contact surfaces of example contact elements according to some embodiments.
Figure 4B:
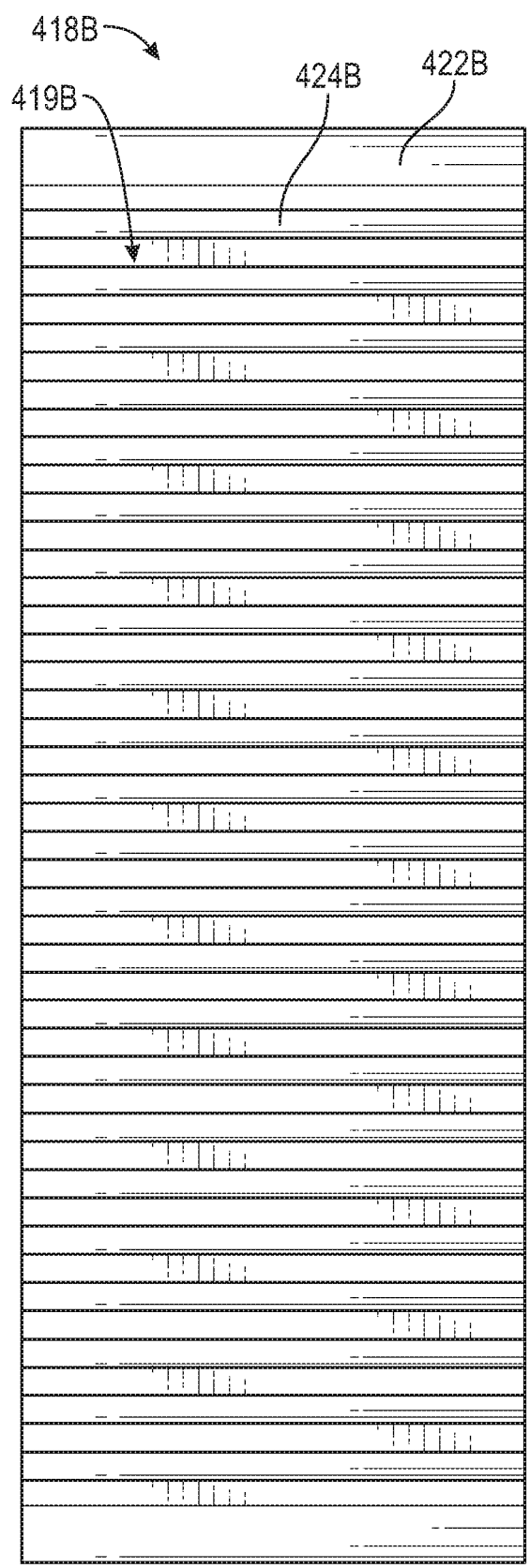
Figure 4C:
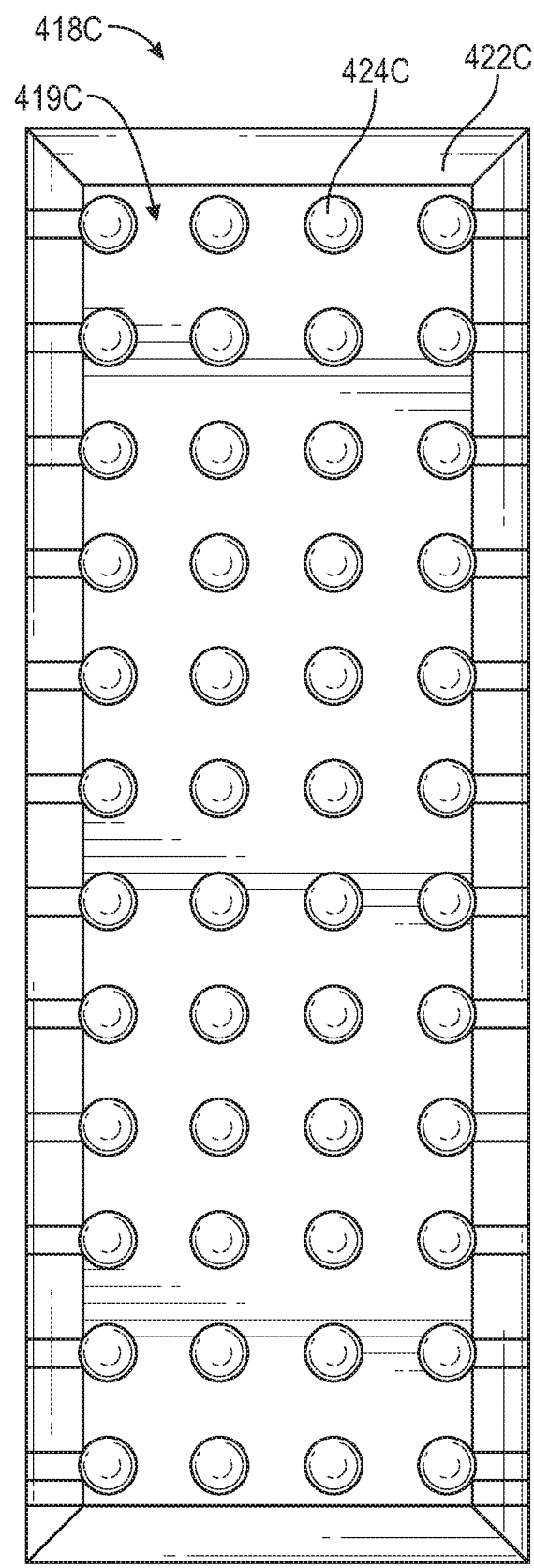

Example contact elements having a variety of textured contact surfaces are depicted in FIGS. 4A-4C. Referring to FIG. 4A, contact element 418A includes a contact surface 419A. In the illustrated embodiment, the contact surface 419A may include a substantially planar central region 424A and raised edge regions 422A that extend peripherally around the central region 424A. The height, length, and width of the raised edge regions 422A are not particularly limited. For instance, the width of each raised edge region 422A may be up to approximately 50% of a width of the contact surface 419A.

Referring to FIG. 4B, contact element 418B includes a contact surface 419B having a contact region 424B and a plurality of horizontal ribs 422B extending upward from the contact region 424B. As will be appreciated, the geometry, e.g., the width, spacing, and/or pitch, of the raised ribs 422B are not particularly limited and may be configured to provide a desired surface texture for contact element 418B.

Referring to FIG. 4C, contact element 418C includes a contact surface 419C. The contact surface 419C includes a substantially planar central region and a raised peripheral edge region 422C. Contact surface 419C may further include an array of raised nibs 424C, i.e., within the planar region. As in the previous embodiment, the height, length, width, spacing, and/or pitch of the raised nibs 424C are not particularly limited. For instance, the raised nibs 424C may be disposed within a regular array, as illustrated, or randomly over the contact surface 419C. Moreover, although contact elements 418A, 418B, and 418C are illustrated as generally rectangular, other shapes and dimensions for contact elements 418A, 418B, and 418C are contemplated.

In accordance with various embodiments, a haptic shear mode, where an individual's skin may be stretched or squeezed by one or more shear actuators 100, can be used, for example, to suggest the locomotion of the individual within a virtual space and/or simulate the interaction of the individual with virtual objects. In various embodiments, plural motorized shear actuators 100 may be used in a single device and implemented as a single actuator assembly, where the action of multiple actuators in the assembly can be coordinated to provide richer effects and more grounding options than in devices including an individual actuator.

Referring to the mutually-transverse views of FIG. 5 and FIG. 6, shown are example embodiments of a head-mounted display (HMD) 500 worn by a user 520. The HMD 500 may include a NED, which may include one or more display devices. The depicted embodiment includes a left display device 510L and a right display device 510R, which are collectively referred to as display device 510. The display device 510 may present media to a user.

The head-mounted display 500 shown in FIGS. 5 and 6 may include a support or frame 505 that secures the display device 510 in place on the head of a user 520, such as in embodiments in which the display device 510 includes separate left and right displays. The frame 505 may be a frame of eyewear glasses, for example.

Examples of media presented by the display device 510 may include one or more images, a series of images (e.g., a video), audio, or some combination thereof. In some embodiments, audio may be presented via an external device (e.g., speakers and/or headphones) that receives audio information from the display device 510, a console (not shown), or both, and presents audio data based on the audio information.

The display device 510 may generally be configured to operate as an AR NED, such that a user can see media projected by the display device 510 and see the real-world environment through the display device 510. However, in some embodiments, the display device 510 may be modified to also operate as a virtual reality (VR) NED, a mixed reality (MR) NED, or some combination thereof. Accordingly, in some embodiments, the display device 510 may augment views of a physical, real-world environment with computer-generated elements (e.g., images, video, sound, etc.). The display device 510, in some examples, may include a waveguide with holographic or volumetric Bragg gratings.

According to some embodiments, shear actuators 100 may be incorporated into HMD 500 in order to provide haptic feedback to the user 520. The haptic feedback may supplement audio and/or visual feedback provided by display device 510. As depicted in FIGS. 5 and 6, shear actuators 100 may be incorporated into the frame 505 such that inwardly-facing contact elements may be configured to apply a shear stress to the head of the user 520 during use. For instance, referring to FIG. 5, illustrated is an example where a perception of forward motion 540 may be created in response to a coordinated (e.g., simultaneous) rearward shear force 545 exerted by each of a pair of motorized shear actuators 100L, 100R that are incorporated into left and right portions, respectively, of frame 505.

According to further embodiments, and with reference to FIG. 6, illustrated is an example where the sensation of rotational motion 550 may be achieved in response to directionally-aligned actuation of shear actuators 100 that are incorporated into left and right elements of the frame 505 of HMD 500. That is, left shear actuator 100L may exert a forward shear force 555a and right shear actuator 100R may exert a rearward shear force 555b (or vice versa) to create the illusion of rotation 550. In various embodiments, the forward and rearward shear forces may be exerted sequentially or simultaneously.

The head-mounted display 500 shown in FIG. 5 and FIG. 6 may include additional components that are not shown, such as a power source (e.g., an integrated power source, such as a rechargeable battery, or a connection to an external power source), memory storage, I/O, or combinations thereof.

Figure 7:
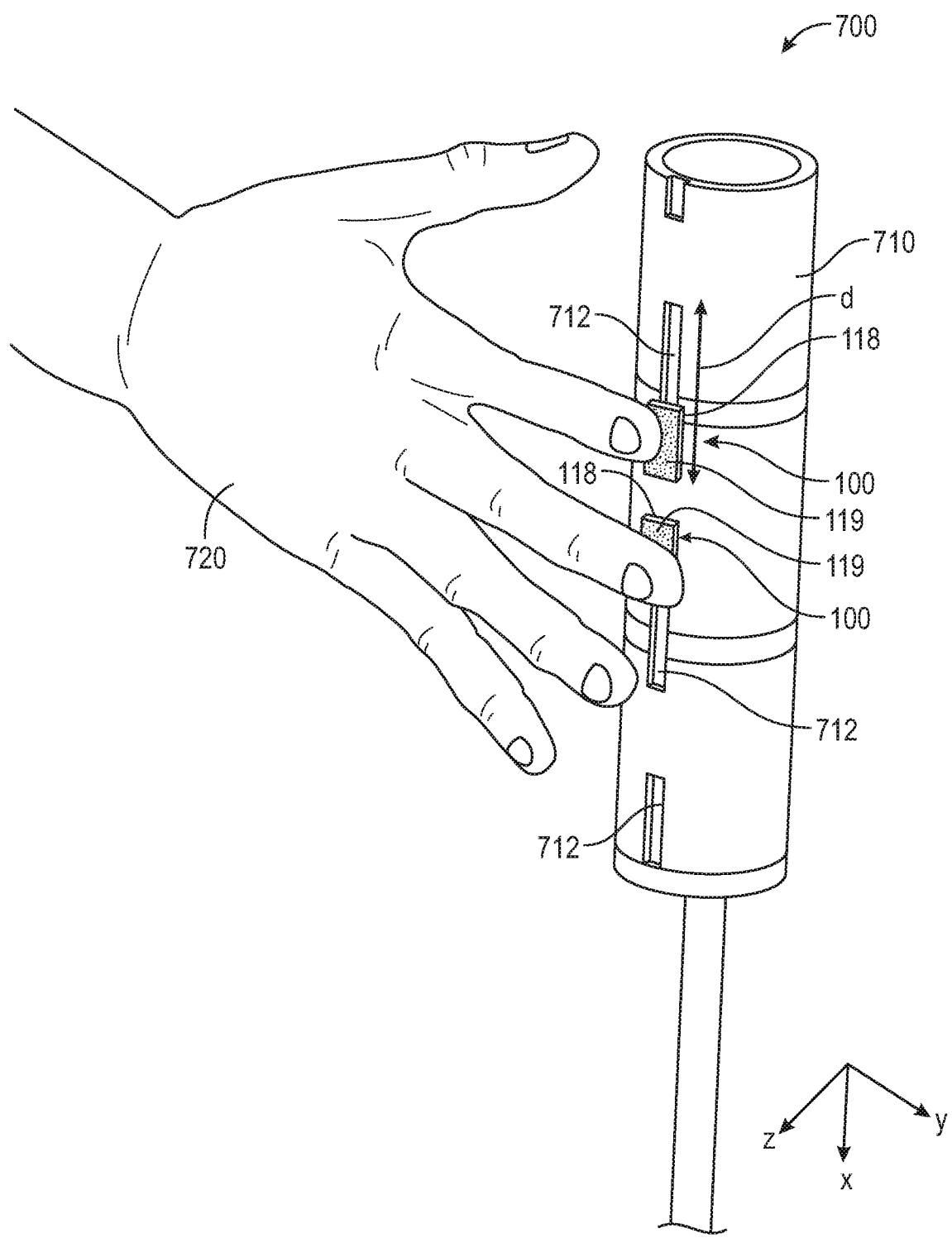
FIG. 7 is a schematic diagram showing a handheld device including a plurality of embedded shear actuators according to some embodiments.

According to further embodiments, as depicted in FIG. 7, multiple motorized shear actuators 100 may be incorporated into the body of a hand-held display 700 where outwardly-facing contact elements 118 may be configured to apply a shear stress to the hand of the user 720 gripping or otherwise interacting with the hand-held display 700. Controlled actuation of the shear actuators 100 may be used to generate a haptic response from one or more of the contact elements 118.

In the hand-held display 700 of FIG. 7, a pair of axially-offset shear actuators 100 are configured to interact with the hand (e.g., digits) of user 720. In some embodiments, shear actuators 100 may apply a shear stress in an axial direction (i.e., along the x-axis). In further embodiments, shear actuators 100 may be disposed to apply a shear stress in a lateral direction (e.g., along the y-axis) or at an oblique angle with respect to a primary axis of the display 700. As will be appreciated, plural shear actuators may be controlled to apply a shear force sequentially or simultaneously.

As illustrated, example hand-held display 700 may have a cylindrical shape. Such an architecture is not limiting, however, as the hand-held display 700 may alternatively include a variety of shapes and geometries, including wearable form-factors such as gloves or mittens, or other devices such as a mouse or a gaming controller.

According to some embodiments, the display body 710 may include a slot 712 through which the output flange for each shear actuator 100 may extend. Each slot 712 may be sized and dimensioned to allow the output flange to translate along its full range of displacement (d).

Figure 8:
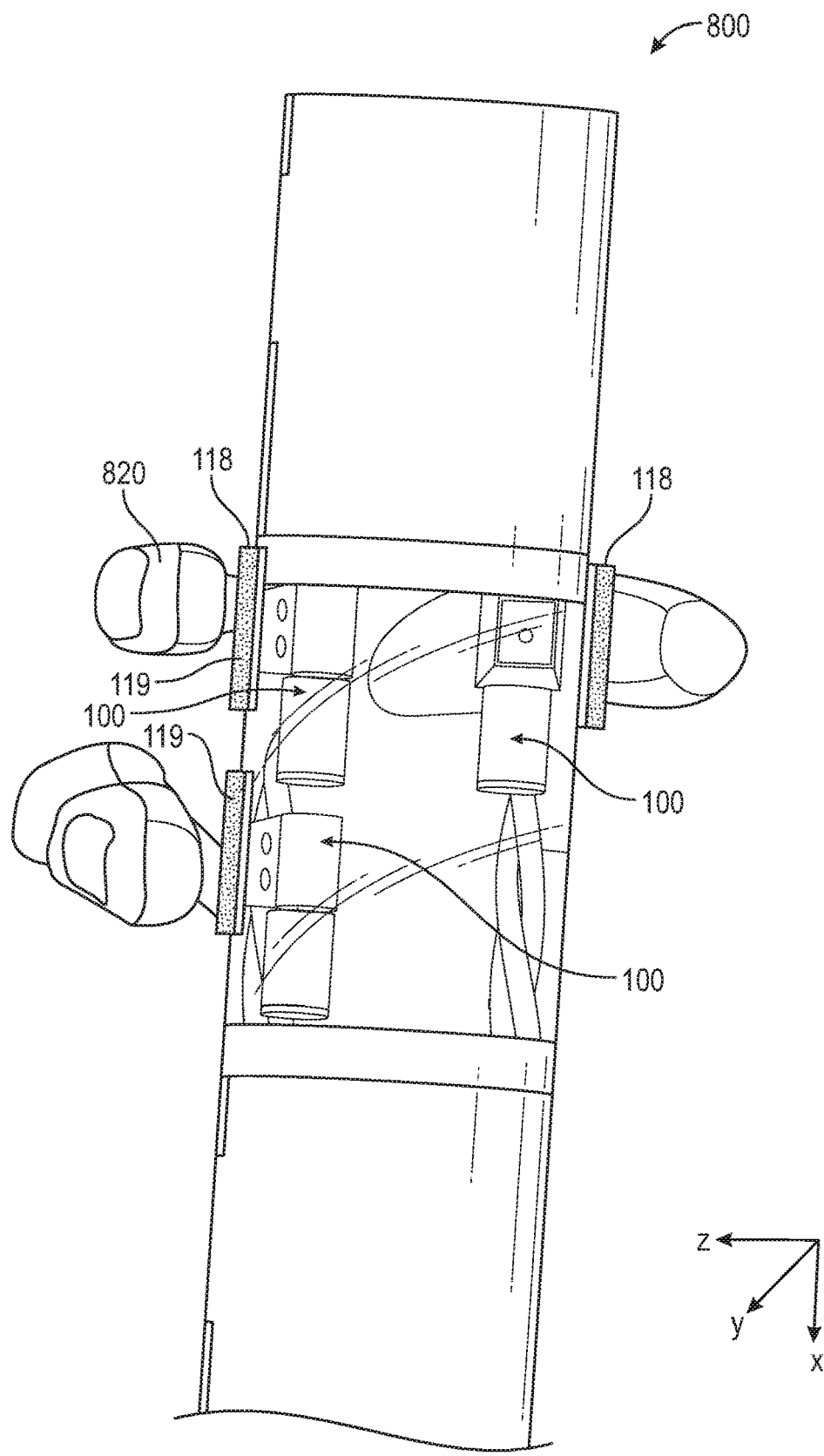
FIG. 8 is a schematic diagram showing a handheld device having both axially- and radially-offset shear actuators according to some embodiments.

Referring to FIG. 8, shown is a further hand-held display 800 where a trio of shear actuators 100 are arranged to interact with the hand or digits of a user 820. For example, shear actuators 100 may be configured to interface with a user's index finger, middle finger and thumb. In certain embodiments, the various shear actuators 100 in the embodiment of FIG. 8 may apply a shear stress in an axial direction (i.e. along the x-axis). In further embodiments, one or more of the shear actuators 100 may be disposed to apply a shear stress in transverse direction (i.e., along the y-axis) or at an oblique angle with respect to a major axis of the display 800.

In the illustrated embodiment, the shear actuators 100 are both axially- and laterally-offset with respect to one another. According to some embodiments, such plural shear actuators 100 may be controlled to apply a shear force sequentially or simultaneously. According to some embodiments, both the magnitude and the direction of a shear force applied by each of a plurality of shear actuators may be independently controlled. Furthermore, although various devices, including head-mounted displays, are described herein as having a pair or trio of shear actuators, the number of shear actuators 100 incorporated into a device is not particularly limited, and may range from 2 to 20 shear actuators or more, e.g., 2, 3, 4, 5, 8, 10, 12, 15, or 20 shear actuators, including ranges between any of the foregoing values. According to various embodiments, the number of shear actuators and their respective placement within a device may be chosen to achieve the desired shear force(s) and hence the desired haptic effect(s).

In some embodiments, shear actuators 100 may be coordinated to produce localized skin stretch or lateral deflection. In some embodiments, the shear actuators 100 may be activated synchronously, for example to elicit directional forces, or asynchronously to amplify the relative skin stretch. Such coordination could be used in handheld devices to create dynamic variation in weights or in head-mounted displays to create an illusion of movement.

According to certain embodiments, the shear actuators may be used to move the frame of a head-mounted display during use for automatic tightening or focal adjustment. According to still further embodiments, coordinated actuators can be placed in footwear to create information/illusion of movement or surface texture.

The haptic displays 700, 800 may each include additional components that are not shown, such as a power source (e.g., an integrated power source such as a rechargeable battery, or a connection to an external power source), memory storage, I/O, or combinations thereof.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 900 in FIG. 9. Other artificial reality systems may include a NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
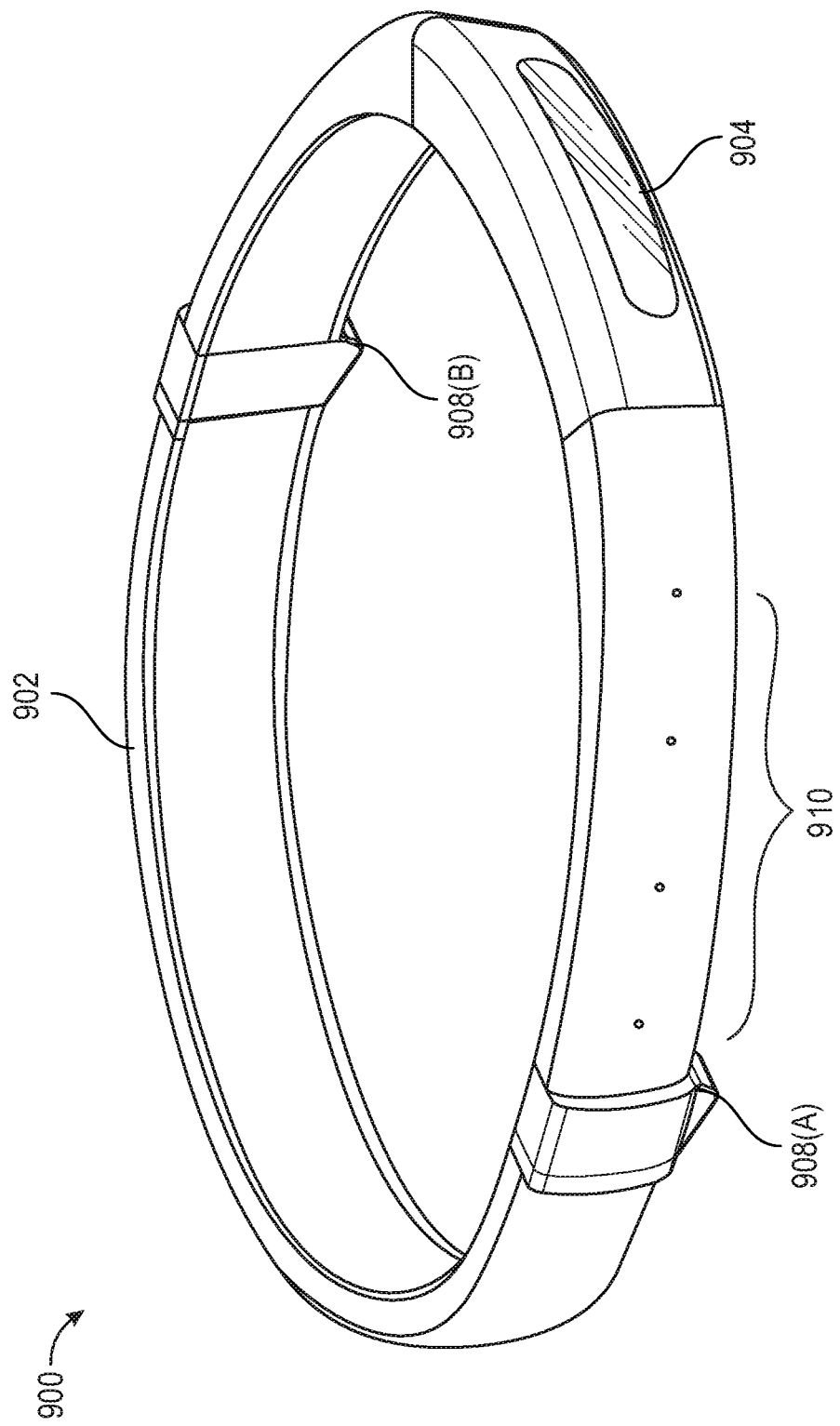
FIG. 9 is an illustration of an exemplary artificial-reality headband that may be used in connection with embodiments of this disclosure.

Turning to FIG. 9, augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. Augmented-reality system 900 may also include one or more audio devices, such as output audio transducers 908(A) and 908(B) and input audio transducers 910. Output audio transducers 908(A) and 908(B) may provide audio feedback and/or content to a user, and input audio transducers 910 may capture audio in a user's environment.

As shown, augmented-reality system 900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 900 may not include a NED, augmented-reality system 900 may include other types of screens or visual feedback devices (e.g., a display screen integrated into a side of frame 902).

Figure 10:
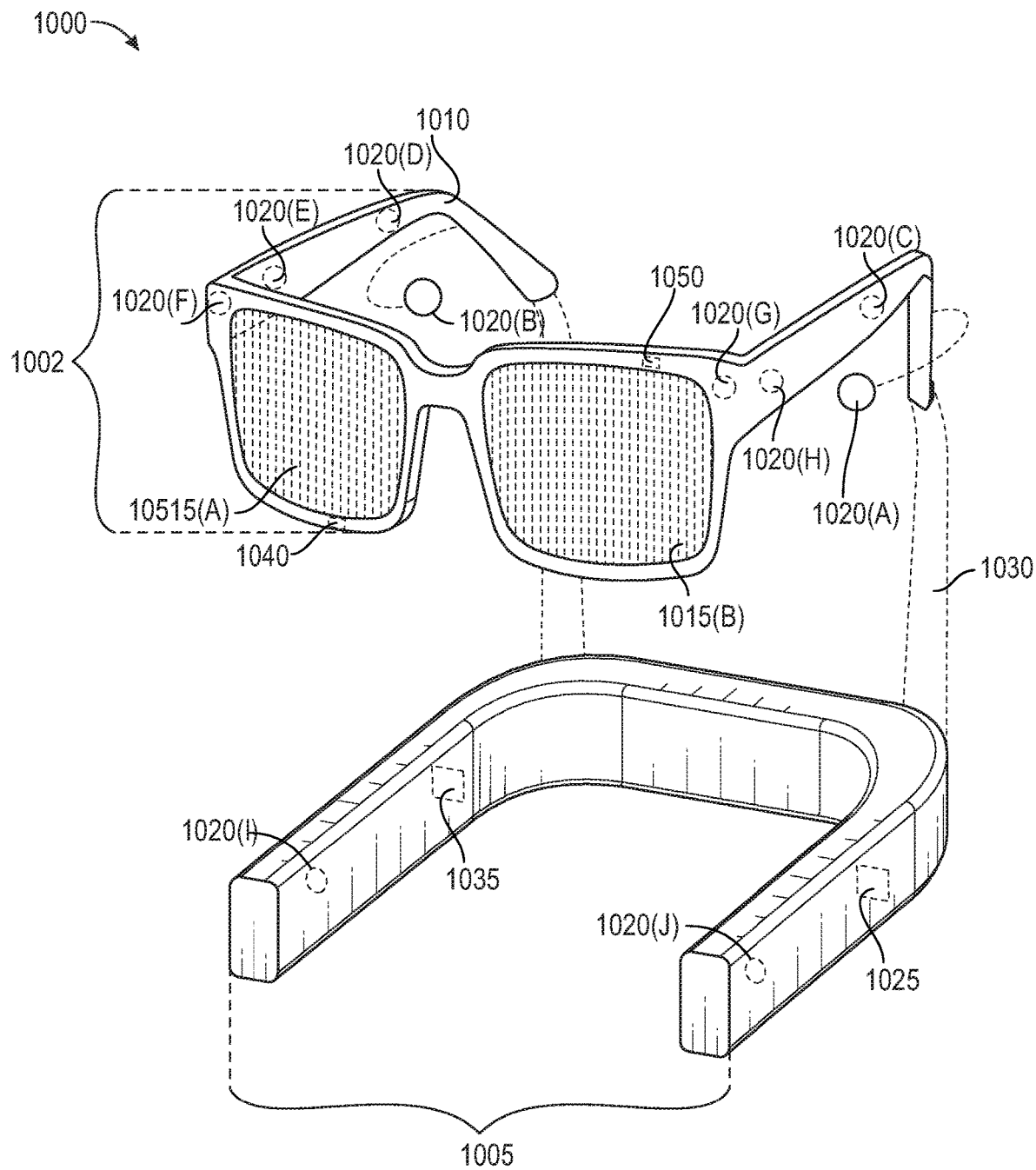
FIG. 10 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 9 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(1) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by the controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer, or some combination thereof.

Acoustic transducers 1020(A) and 1020(B) may be positioned on different parts of the user's ear, such as behind the pinna or within the auricle or fossa. Or, there may be additional acoustic transducers on or surrounding the ear in addition to acoustic transducers 1020 inside the ear canal. Having an acoustic transducer positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(1) and 1020(J)) that are part of the microphone array (or potentially form their own microphone subarray). Neckband 1005 may also include a controller 1025 and a power source 1035.

Acoustic transducers 1020(1) and 1020(J) of neckband 1005 may be configured to detect sound and convert the detected sound into an electronic format (analog or digital). In the embodiment of FIG. 10, acoustic transducers 1020(1) and 1020(J) may be positioned on neckband 1005, thereby increasing the distance between the neckband acoustic transducers 1020(1) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1100 and/or virtual-reality system 1100 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 900, augmented-reality system 1000, and/or virtual-reality system 1100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 9 and 11, output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 910 may include condenser microphones, dynamic microphones, ribbon microphones, and/or any other type or form of input transducer. In some embodiments, a single transducer may be used for both audio input and audio output.

Figure 11:
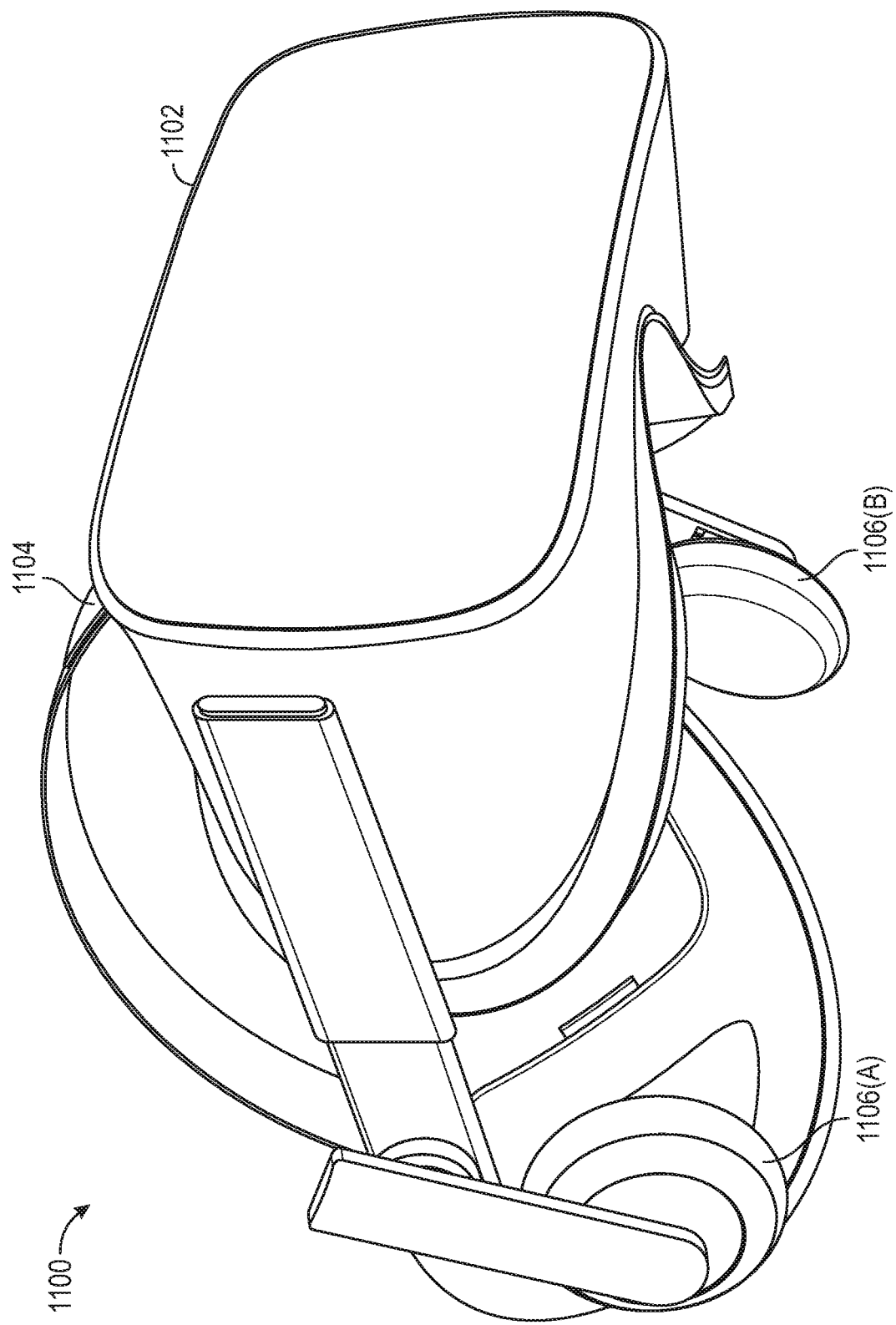
FIG. 11 is an illustration of an exemplary virtual-reality headset that may be used in connection with embodiments of this disclosure.

While not shown in FIGS. 9-11, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 900, 1000, and 1100 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
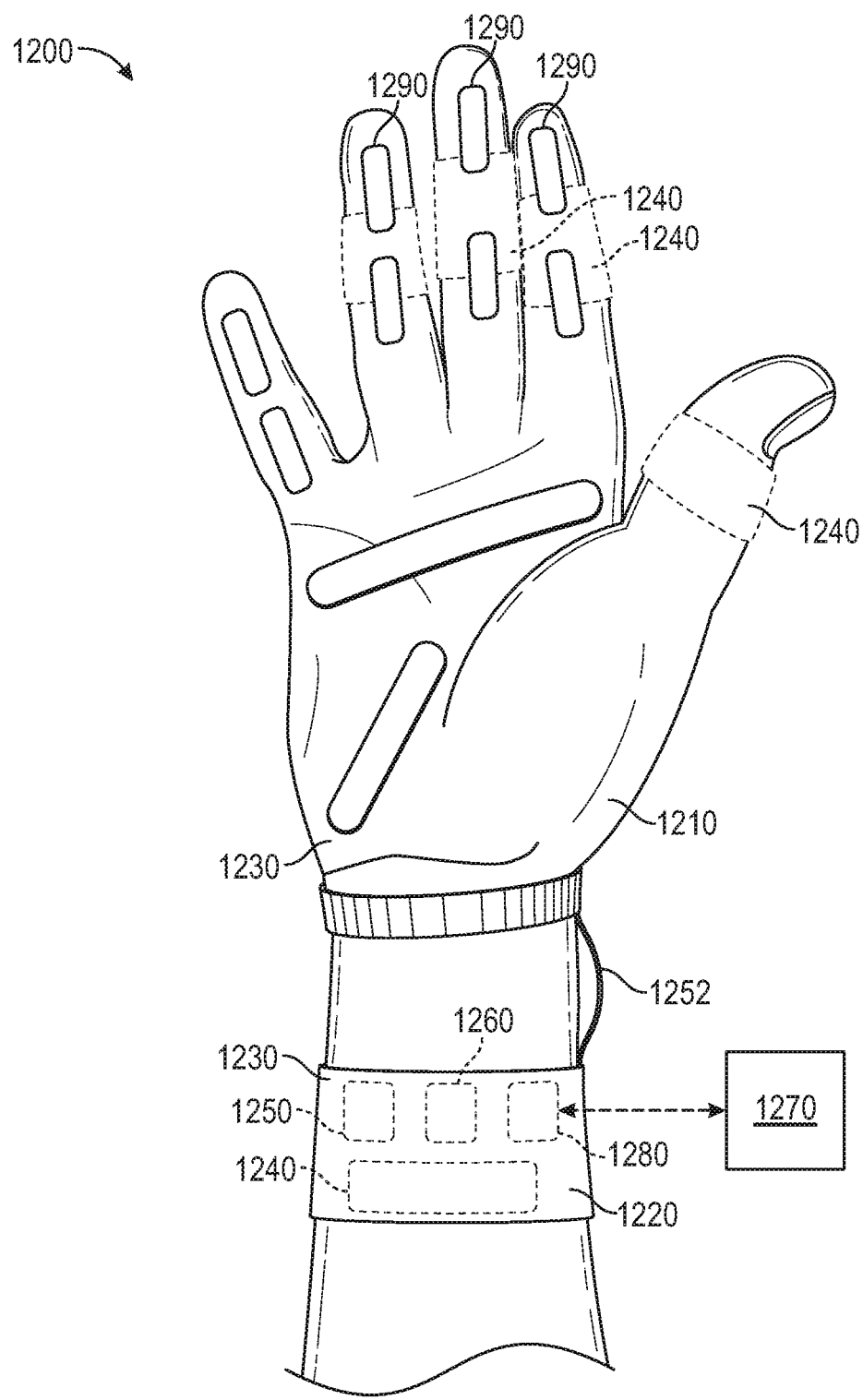
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a skin-shear system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes skin-shear systems that may be shaped and configured for positioning against other human body parts, such as a finger, an arm, a head, a torso, a foot, or a leg. By way of example and not limitation, skin-shear systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more skin-shear devices 1240 may be positioned at least partially within one or more corresponding pockets formed in textile material 1230 of skin-shear system 1200. Skin-shear devices 1240 may be positioned in locations to provide a vibrating sensation (e.g., haptic feedback) to a user of skin-shear system 1200. For example, skin-shear devices 1240 may be positioned to be against the user's finger(s), thumb, or wrist, as shown in FIG. 12. Skin-shear devices 1240 may, in some examples, be sufficiently flexible to conform to or bend with the user's corresponding body part(s).

A power source 1250 (e.g., a battery) for applying a voltage to the skin-shear devices 1240 for activation thereof may be electrically coupled to skin-shear devices 1240, such as via conductive wiring 1252. In some examples, each of skin-shear devices 1240 may be independently electrically coupled to power source 1250 for individual activation. In some embodiments, a processor 1260 may be operatively coupled to power source 1250 and configured (e.g., programmed) to control activation of skin-shear devices 1240.

Skin-shear system 1200 may be implemented in a variety of ways. In some examples, skin-shear system 1200 may be a standalone system with integral subsystems and components for operation independent of other devices and systems. As another example, skin-shear system 1200 may be configured for interaction with another device or system 1270. For example, skin-shear system 1200 may, in some examples, include a communications interface 1280 for receiving and/or sending signals to the other device or system 1270. The other device or system 1270 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1280 may enable communications between skin-shear system 1200 and the other device or system 1270 via a wireless (e.g., Wi-Fi, Bluetooth, cellular, radio, etc.) link or a wired link. If present, communications interface 1280 may be in communication with processor 1260, such as to provide a signal to processor 1260 to activate or deactivate one or more of the skin-shear devices 1240.

Skin-shear system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, skin-shear devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
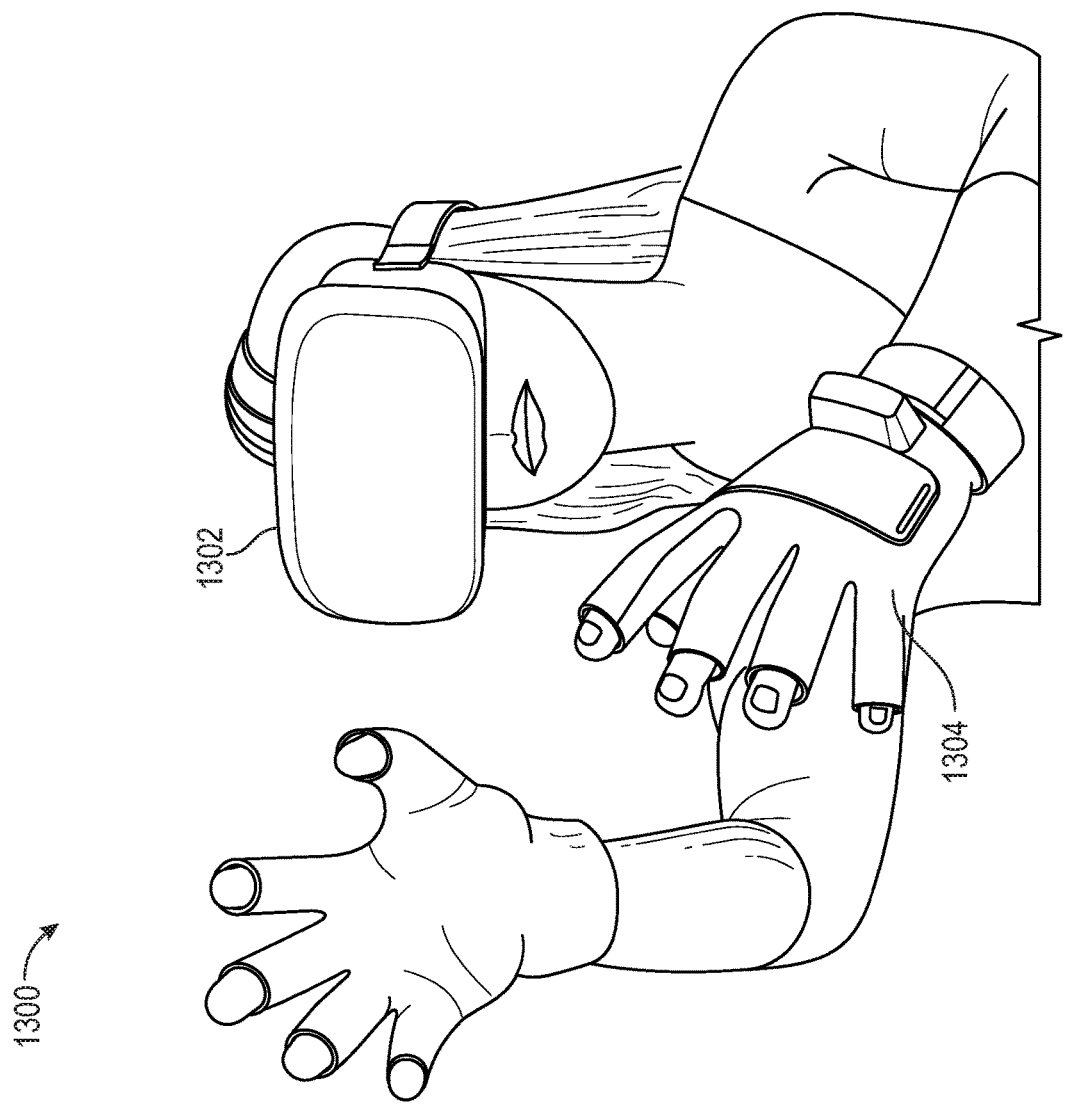
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial reality environment 1300 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1302 generally represents any type or form of virtual-reality system, such as virtual-reality system 1100 in FIG. 11. Haptic device 1304 generally represents any type or form of wearable device, worn by a use of an artificial reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
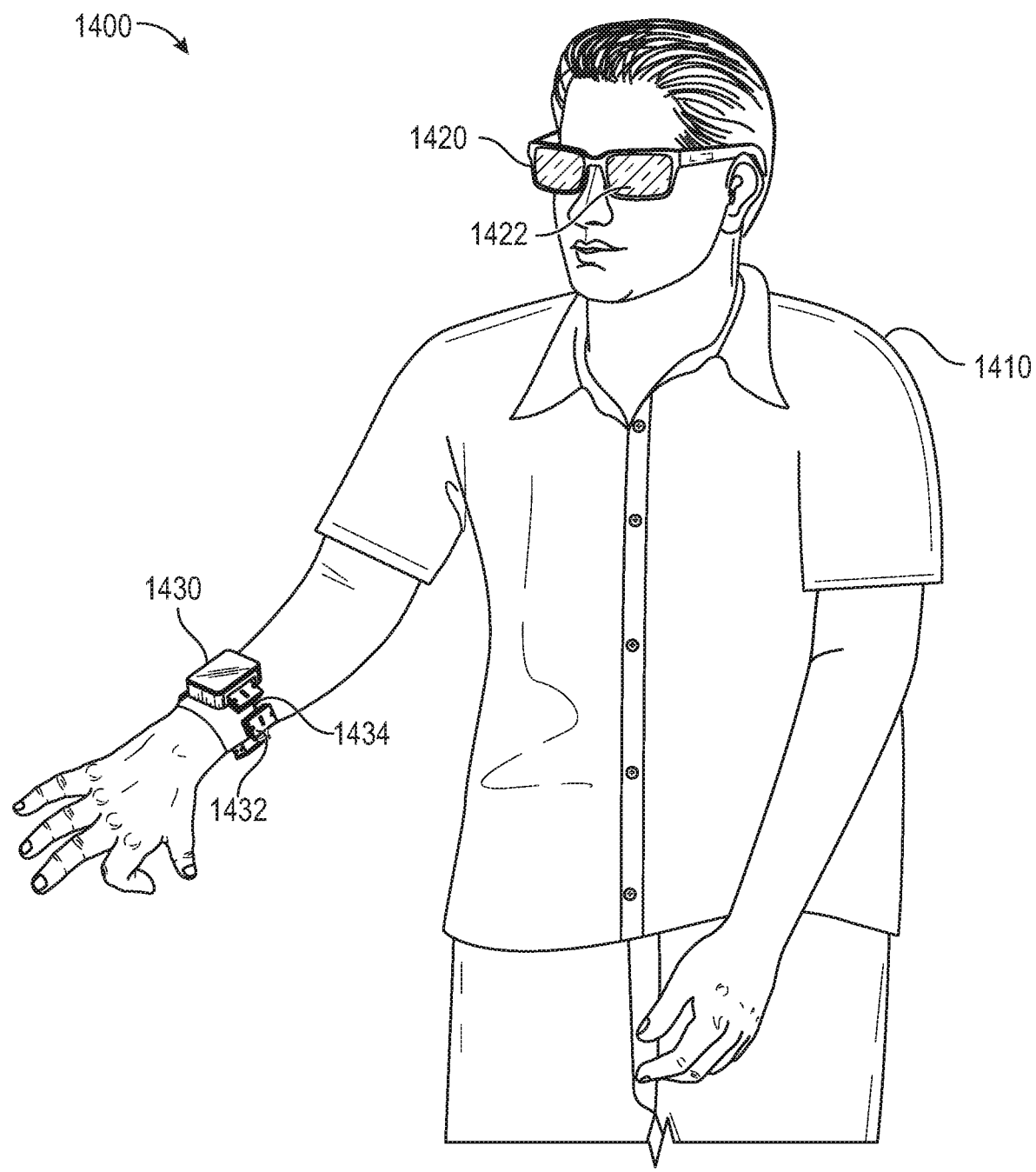
FIG. 14 is an illustration of an exemplary augmented-reality environment according to embodiments of this disclosure.

While haptic interfaces may be used with virtual-reality systems, as shown in FIG. 11, haptic interfaces may also be used with augmented-reality systems, as shown in FIG. 10. FIG. 14 is a perspective view a user 1410 interacting with an augmented-reality system 1400. In this example, user 1410 may wear a pair of augmented-reality glasses 1420 that have one or more displays 1422 and that are paired with a haptic device 1430. Haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor (e.g., a skin-shear actuator) configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a skin-shear actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head-mounted display comprising:
a frame; and
a shear actuator incorporated into the frame, the shear actuator comprising:
   a drive mechanism;
   a lead screw comprising a threaded outer surface rotatably coupled to the drive mechanism and extending along a primary axis;
   a carriage disposed within a chassis, the carriage movably coupled to the lead screw by a nut having a threaded inner surface; and
   a flexure spring attached to the chassis, the flexure spring configured to exert a reactive force to resist a force applied to the carriage in a direction orthogonal to or substantially orthogonal to the primary axis.

2. The shear actuator of claim 1, wherein the carriage is configured to bilaterally translate along the primary axis.

3. The shear actuator of claim 1, wherein the inner surface of the nut is threaded over the outer surface of the lead screw.

4. The shear actuator of claim 1, wherein a bottom surface of the nut is slideably engaged with a bearing integral with an upper surface of the chassis.

5. The shear actuator of claim 1, further comprising a sensing element mounted to the chassis proximate to the carriage.

6. The shear actuator of claim 1, wherein the carriage comprises an output flange extending radially from the primary axis.

7. The shear actuator of claim 6, further comprising a contact element attached to the output flange.

8. The shear actuator of claim 6, wherein a bottom surface of the nut is configured to contact an upper surface of the chassis in response to a normal force exerted on the output flange.

9. A head-mounted display comprising:
a frame; and
independently-controlled primary and secondary shear actuators incorporated into the frame, wherein each shear actuator includes:
   a drive mechanism;
   a lead screw comprising a threaded outer surface rotatably coupled to the drive mechanism and extending along a primary axis;
   a carriage disposed within a chassis, the carriage movably coupled to the lead screw by a nut having a threaded inner surface; and
   a flexure spring attached to the chassis, the flexure spring configured to exert a reactive force to resist a force applied to the carriage in a direction orthogonal to or substantially orthogonal to the primary axis.

10. The device of claim 9, wherein the primary and secondary shear actuators are synchronously activated or asynchronously activated.

11. The device of claim 9, wherein a bottom surface of the nut is configured to contact an upper surface of the chassis in response to a normal force exerted on the carriage.

\* \* \* \* \*